INVENTOR.
HARDEN D. VOLLMER JR
BY
John F. Luhrs
ATTORNEY

United States Patent Office 3,138,000
Patented June 23, 1964

3,138,000
CONTROL FOR SUPERCHARGED VAPOR
GENERATORS
Harden D. Vollmer, Jr., Willoughby, Ohio, assignor to
Bailey Meter Company, a corporation of Delaware
Filed Dec. 5, 1960, Ser. No. 73,883
10 Claims. (Cl. 60—39.18)

This invention relates to the control of supercharged vapor generators and more particularly to the control of a vapor generator which is pressurized by means of a compressor powered at least in part by a gas turbine driven from the combustion gases discharged from the vapor generator.

In conventional types of vapor generators gas pressures are substantially atmospheric, while in supercharged vapor generators the gas pressures are relatively high in the order of 50 to 70 p.s.i.a. at full power. A supercharged vapor generator has a somewhat higher efficiency and is of much less bulk than a conventional generator of corresponding output. It is therefore commercially more desirable particularly for applications where space is at a premium such as in mobile power plants, both for land and sea.

To attain highest efficiency it is essential that air flow to the generator be maintained in a predetermined ratio to the fuel flow over the entire operating range which, for example, may be in the order of 20 to 1 or more, that is, from full power down to 5% of full power or less. The mass flow of combustion gases to the gas turbine varies accordingly, being equal to the weight rate of air flow to the generator plus the weight rate of fuel flow.

The mass gas flow to the turbine is not sufficient, at reduced vapor generator outputs, to maintain the required compressor output and at the higher generator outputs produces a greater compressor output than required. In general, there is a relatively small range in generator vapor outputs wherein the compressor output corresponds precisely to the air flow required for optimum combustion efficiency. At lower ratings the compressor output decreases rapidly and at higher ratings increases rapidly from that required. Operation of the vapor generator at reduced ratings, because of the relatively low mass flow of combustion gases, may cause the gas turbine to stall or the air compressor to go into surge subjecting it to violent and severe shocks, which if allowed to continue, may result in serious damages or even complete destruction of the unit.

Over the lower range of ratings of the vapor generator it is therefore desirable and in fact necessary to provide additional energy input to the compressor. In the embodiment of my invention I have chosen to describe this as provided by means of a vapor driven turbine coupled to the compressor. Likewise at higher ratings it is necessary to dissipate some of the energy supplied the gas turbine. I have found it highly advantageous and desirable to do this by passing all of the combustion gases through the gas turbine and dump to atmosphere air delivered from the compressor over and above that required for combustion.

From the foregoing it will be apparent that a prime objective of my invention is to provide a control for a supercharged vapor generator maintaining optimum operating as well as optimum combustion conditions over a wide range of operation.

More specifically it is a further object of my invention to provide such a control making maximum use of the combustion gases to drive the supercharger and minimum use of an auxiliary source of power.

Still a further object of my invention is to provide such a control selectively assisting the gas turbine driving the supercharger or dumping a portion of the supercharger output as may be required to maintain the supply of combustion air equal to the demand therefor.

Another object of my invention is to provide a control for a supercharged vapor generator maintaining safe and efficient combustion conditions under rapidly fluctuating loads as well as under steady state conditions.

These and further objects will be apparent from the description to follow and from the drawings in which.

Figure 1:
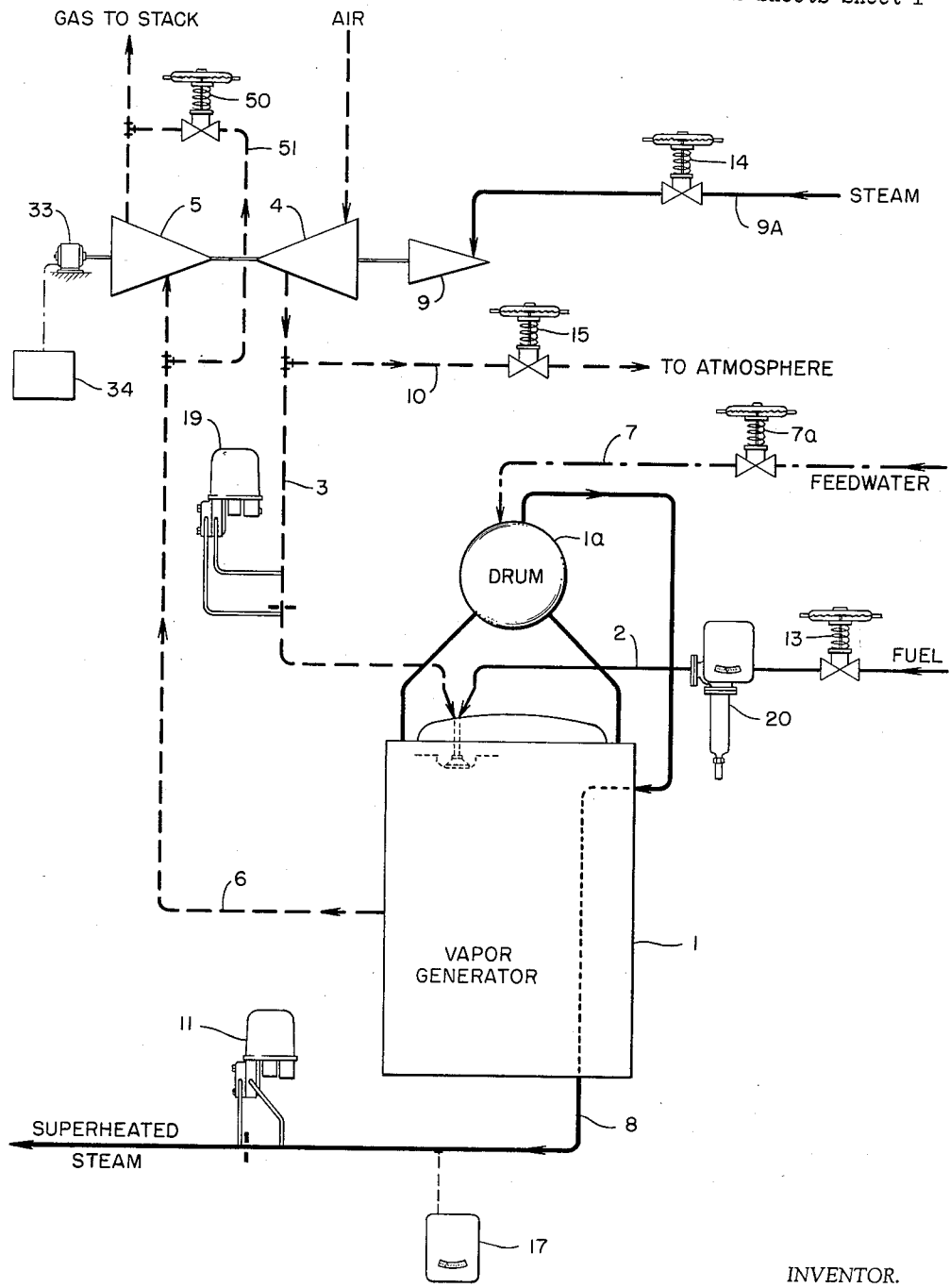
FIG. 1 is a cycle diagram of a supercharged vapor generator to which my control may be applied.

Referring now to FIG. 1 I therein show the vapor generator 1 to which fuel, as for example, fuel oil, is supplied through a pipe 2 from any suitable source (not shown). Air for combustion is supplied through a conduit 3 from an axial flow air compressor 4. The exhaust gases from the generator 1 are transmitted to a gas turbine 5 through a conduit 6 and after passing therefrom are discharged to atmosphere. Feedwater under pressure is supplied to generator 1 through a pipe 7 from any suitable source (not shown). The rate of flow of feedwater may be controlled by a valve 7a through suitable instrumentalities to maintain a desired water level in the drum 1a as will be readily understood by those familiar with the art. The generator 1 may or may not be provided with an integral superheater. Generated vapor is discharged through a conduit 8 to a point of usage (not shown). As heretofore stated the usual vapor generator operates with the gas side at substantially atmospheric pressure, whereas the generator 1 is arranged to operate at full load under several atmospheres of pressure in the order of 50 p.s.i.a., such pressure being produced by the axial flow compressor 4. The generator 1 may be designed for any desired max. capacity and steam conditions such as, for example, 100,000 lbs./hr. at 1000 p.s.i.g. and 1000° F. total temperature.

As self evident, ideally the exhaust gases discharged from the generator 1 would be just sufficient to cause the gas turbine 5 to maintain the discharge from the compressor 4 exactly equal to the air requirements at the then existing load. However, because of the inherent characteristics of the gas turbine and compressor this ideal condition is not realized in practice, the gas turbine being unable, at the lower ratings to sustain operation of the compressor and at the higher ratings causing the compressor to produce a surplus of air. To make up the deficiency of the gas turbine output at the lower ratings an auxiliary source of power such as a steam turbine 9 is provided which is supplied steam through a pipe 9A from any suitable source (not shown). To decrease the output of the gas turbine at the higher ratings I permit all of the exhaust gases to pass through the turbine 5 and dump to atmosphere through a conduit 10 the surplus compressor discharge. Such an arrangement serves to maintain the compressor removed from the surge condition during normal operation and only under severe transient conditions is the compressor likely to momentarily go into surge.

Figure 2:
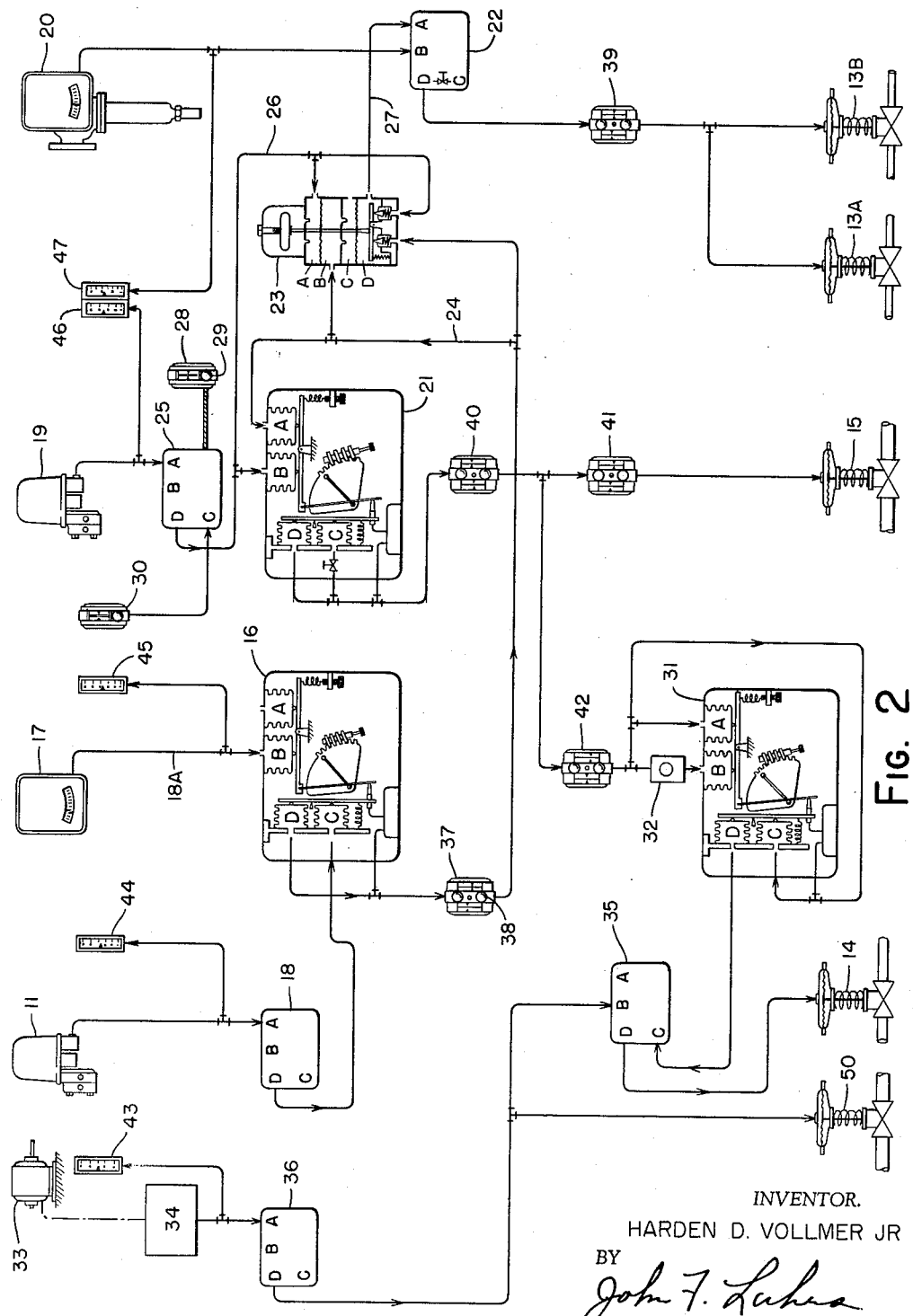
FIG. 2 is a diagrammatic illustration of a control embodying my invention arranged for application to the cycle shown in FIG. 1.

In FIG. 2 I have illustrated diagrammatically a control system embodying my invention arranged for application to the vapor generator cycle shown in FIG. 1. Measuring instruments and final control elements shown in FIG. 2 have been referenced into FIG. 1. It will become apparent as the description proceeds that I have provided the necessary visual aids and operating devices for the manual operation of the vapor generator in accordance with my invention. That is to say it will become apparent that my invention comprehends a new and novel method of control as well as an automatic system of control. Further, that while I have illustrated a control system of the so-called pneumatically operated type my invention may equally as well be incorporated in electric or hydraulic instrumentalities.

Representative of the objectives of the control system shown in FIG. 2 are the following: (1) maintain vapor production equal to vapor demand, (2) maintain the desired fuel air ratio for optimum combustion efficiency, (3) utilize the exhaust gases to the maximum extent permitted for driving the supercharger, (4) provide a smooth transition from steam turbine assist to complete flue gas propulsion of the supercharger, (5) maintain operation of the supercharger outside the so-called "surge" area, (6) provide a control system which will attain these objectives not only under steady state conditions but under rapidly fluctuating loads and under a wide range of loads in the order of 20 to 1 or more.

Referring now to FIG. 2 there is illustrated a control wherein the elements of combustion, that is fuel and air, are adjusted in accordance with changes in the rate of steam flow and readjusted as required to maintain steam pressure at a predetermined or as it may be said, desired value. I show a telemeter transmitter 11 responsive to the rate of vapor flow in conduit 8 and adapted to generate a loading pressure proportional to the rate of steam flow. Neglecting for the moment intermediate devices later to be described, the loading pressure established by transmitter 11 is effective to position fuel oil control valves 13A and 13B (consolidated in FIG. 1 to a single valve 13). Changes in steam flow thus produce corresponding changes in the rate of fuel flow. Multiple fuel valves, arranged for series operation, are provided to increase the control range. Assume for example that transmitter 11 produces a loading pressure varying from 3 to 27 p.s.i. from zero to full generator output. Valve 13A may be arranged to go from closed to open for a change in this loading pressure from 3 to 15 p.s.i. and the valve 13B to go from closed to open for a change in this loading pressure from 15 to 27 p.s.i. I have shown two fuel control valves as being representative of such practice to obtain a wide control range, it being evident that any number of serially operated valves may be provided as required to obtain the control range desired. Further it will be apparent that any kind and arrangement of final control elements may be provided as determined by the fuel being utilized.

The loading pressure established by transmitter 11 as modified by intermediate devices later to be described is also effective for positioning a turbine throttle valve 14 or a dump valve 15 to assist the gas turbine in driving the compressor 4 or to dump surplus air to maintain the correct rate of air flow for combustion. Let it be remembered that a change in fuel flow inherently causes a change in compressor discharge roughly approximating the change in combustion air required. Positioning of the valves 14 and 15 may therefore be looked upon in the nature of a "trim" operation assisting the turbine 5 in maintaining the correct flow of air to the generator 1.

While fundamentally fuel and air are varied in accordance with changes in demand as indicated by changes in steam flow, the loading pressure produced by transmitter 11 is modified in a relay 16 in accordance with changes in vapor pressure. A transmitter 17 generates a loading pressure proportional to steam pressure which is transmitted to relay 16 through a pipe 18A. The relay 16 may, for example, be of a type illustrated and described in United States Patent 2,805,678 issued to Michael Panich on Sept. 10, 1957, and is provided with an adjustable proportional band. A loading pressure is produced at outlet port D proportional to the algebraic sum of the pressures introduced into the relay at ports C and B. Thus the pressure generated by transmitter 11 is increased or decreased through the agency of relay 16 as required to maintain steam pressure at a predetermined or desired value. A relay 18 similar to relay 16, having an adjustable proportional band is provided to conform changes in fuel and air to changes in steam flow.

In accord with practices well established in the control art I employ a constant flow control of both fuel and air and adjust the set points of these constant flow controls in accordance with changes in steam flow as modified by changes in steam pressure. Accordingly a given change in vapor flow, for example, will produce a predetermined and precise change in both fuel and air flow to the end that the change in energy input to the generator 1 is substantially equal to the change in energy output therefrom. That is to say the positions of the final control elements 13, 14 and 15 are adjusted until the change in fuel flow and air flow is equal to the change in demand therefore as indicated by the change in loading pressure at port D of relay 16.

Various known instrumentalities may be employed for measuring air flow and fuel flow. As representative of such devices I show an air flow transmitter 19 and an oil flow transmitter 20 for generating loading pressures proportional to the rate of air flow and fuel flow respectively. Disposed in the loading line from the transmitter 19 is a differential relay 21 and disposed in the loading line from transmitter 20 is a similar relay 22. Each is of the so-called proportional plus reset type incorporating a proportional band adjustment and having automatic adjustable reset. Panich Patent 2,805,678 may be referred to for a complete description of a typical form of this type of relay. The arrangement is such that the positions of control valves 14 and 15 are varied as required to maintain the loading pressure generated by transmitter 19 (proportional to air flow) equal to the loading pressure established by relay 16. That is to say the output pressure at port D of relay 21 is stabilized only when the loading pressure introduced into port B is equal to or stands in predetermined proportion to the loading pressure introduced into port A. Likewise relay 22 may be said to similarly cause adjustment of fuel valves 13A and 13B as required to maintain the loading pressure generated by transmitter 20 (proportional to fuel flow) equal to the loading pressure established by relay 16.

The foregoing represents a generalized and simplified statement of the operation of my control to assist in the understanding thereof. I will now describe the various intermediate devices through which operation is materially improved particularly during transient load conditions.

Referring again to FIG. 2 it will be noted that the loading pressure established by relay 16 is not transmitted directly to relay 22 but is introduced into the B chamber of a selective relay 23 through a pipe 24. The loading pressure generated by transmitter 19 is introduced into the A chamber of relay 23 through a pipe 26. Relay 23 acts to select the lower of the pressures introduced into chambers A and B and transmit this pressure by way of chamber D through a pipe 27 to relay 22 for establishing the set point of the constant fuel flow control. Thus fuel flow can at no time be greater than that correct for the then existing air flow thus avoiding a deficiency of air in the generator 1. On the other hand it may decrease as rapidly as the loading pressure in pipe 24 decreases or in other words as rapidly as the load on vapor generator 1 decreases. Such an arrangement avoids the possibility of the fuel flow increasing more rapidly than the actual rate of air flow as could occur if changes in loading pressure from the relay 16 were effective directly on the fuel flow control. While changes in loading pressure from relay 16 "demand" parallel changes in fuel and air in correct proportion, the actual change in air flow usually lags the change in fuel flow because of the relatively slow response of the air supply means. Until the actual change in air flow is equal to the demand change a deficiency of air in the combustion chamber may therefore exist. The incomplete combustion resulting from such deficiency is highly inefficient and usually causes smoke which is undesirable and in fact under certain conditions may be dangerous. By providing the selective relay 23 the fuel flow can increase no faster than air flow thus assuring complete combustion and maintenance of the correct fuel-air ratio. Conversely upon a decrease in load the loading pressure established by relay 16 will be transmitted directly to relay 22 if actual air flow does not respond immediately. Such operation is highly desirable as it permits the energy input to generator 1 to immediately follow decreases in energy output thereby avoiding material changes in vapor pressure.

Relay 25 having an adjustable proportional band provides a means for adjusting the ratio between fuel and air which is maintained by the control thus in effect providing a means for adjusting the excess air. Adjusting the proportional band changes the ratio between the loading pressures introduced into port A and that at the output port D. As illustrated and described in the Panich Patent 2,805,678, the relay 25 may be provided with a remote means such as knob 29 for adjusting the proportional band and an indicator 28 for displaying the proportional band setting. A graduated manual loader 30 may also be provided to introduce into relay 25 a biasing loading pressure which in effect adds to or subtracts from the loading pressure generated by transmitter 19 to thereby provide a means for maintaining a higher ratio of air to fuel, for example, at low ratings than at high ratings as is frequently desirable.

Passing now to the details of the control for the axial flow compressor 4, mention has been made of the fact that the output thereof will in general follow the changes in fuel flow when driven by the gas turbine 5 alone. Ideal operation would be realized if such "following" maintained precisely the desired rate of air flow to generator 1 whereby complete self regulation of the air flow would be realized. As has been discussed in detail, however, such ideal operation is not attainable and it is therefore necessary to assist the gas turbine, or to dispose of any surplus output. Likewise changes in generator load would ideally be followed immediately by corresponding changes in air flow. Again such ideal operation is not realized because of the small energy storage in the flue gas and the inertia of the gas turbine and compressor which causes relatively slow acceleration and deceleration. My control is arranged to minimize these limitations.

As has been mentioned, the valves 14 and 15 provide a "trim" operation causing the steam turbine 9 to assist the gas turbine 5 or to dispose of surplus air as the case may be. When the output of the compressor 4, driven solely by gas turbine 5 maintains precisely the required air flow, then the loading pressure at port B of relay 21 is equal to the loading pressure at port A. Under these conditions the output pressure at port D of relay 21 remains fixed at whatever value required to maintain both valve 14 and valve 15 in the closed position or to maintain both partially open so that the assist given by the steam turbine is compensated by a corresponding wastage through dump valve 15. It may be assumed for illustrative purposes, for example, that valve 14 is closed below 14 p.s.i.g. loading pressure and then opens as the loading pressure increases until it is fully open at 27 p.s.i.g. In the mirror image so to speak, valve 15 may be assumed to be closed above 15 p.s.i.g. and to open as the loading pressure is reduced becoming wide open at 3 p.s.i.g. With such valve adjustments so long as with gas turbine drive alone the compressor output is correct, relay 21 will produce and maintain at output port D a pressure between 14 and 15 p.s.i.g. so that the slight assist by steam turbine 9 is dissipated by wastage through valve 15. As appreciated by those familiar with the art a low rate of steam flow through the turbine 9 at all times may be necessary to provide adequate cooling thereof. The valve 14 may be arranged with a position stop to prevent tight closing and allowing steam to pass at the rate required for adequate cooling. By having turbine 9 direct connected to the compressor 4 and hence rotating at all times a minimum of such steam is required.

Now let it be assumed that the load on generator 1 decreases causing a proportionate decrease in loading pressure at port A of relay 21. An immediate and proportionate decrease in pressure at port D will occur causing valve 15 to open and valve 14 to close proportionately. An immediate decrease in air flow to the generator 1 will thus occur. As the decrease in air flow causes a corresponding decrease in gas flow to the turbine 5 readjustment of valves 14 and 15 will occur as required to maintain the rate of air flow to the generator 1 at the correct value. Ultimately if operation is below the self sustaining point of gas turbine 5 the valve 14 will remain partially open and the valve 15 will be closed whereby the deficiency in output of gas turbine 5 is made up of steam turbine 9. Conversely, if operation is above the self sustaining point valve 15 will remain partially open and valve 14 will be closed and the surplus air wasted.

To improve the rate of response of the turbine 5 to changes in demand a relay 31 is provided arranged to produce an accelerating action as it is termed in the control art. That is to say arranged so that the output pressure thereof at port D is proportional to the rate of change in the input pressure thereto. The loading pressure from relay 21 is admitted directly to port A so that a change in this loading pressure effects an immediate proportionate change in output pressure at D. The constant of proportionality may be adjusted by adjustment of the proportional band. This input loading pressure is also introduced into port B through an adjustable bleed valve 32 so that following a change in input loading pressure causing an immediate and relatively large change in output pressure, the pressures at ports A and B gradually equalize causing a corresponding decay in the output pressure. So that when stabilized, that is with the pressures at ports A and B equal, the pressure at output port D will be equal to the input pressure, the input pressure is also introduced into the relay through port C.

In operation, the relay 31 acts to product a change in position of valve 14 proportional to the rate of change in the input pressure to relay 31 which is superimposed upon a change which is proportional to the change in the input pressure. Gradually, through the action of bleed valve 32, the "rate of change" action is erased leaving only the change proportional to the change in input pressure. It will thus be evident upon a change in demand the steam flow to turbine 9 will change an amount greater than that required to satisfy the change in demand, and then gradually the change in steam flow will be reduced to just that required to satisfy the change in demand.

To avoid the possibility of the compressor 4 and associated units attaining an excessive speed through operation of the steam turbine 9, speed may be monitored and the flow of steam to the turbine reduced as the point of excessive speed is approached. To this end I show a tachometer 33 which produces a signal proportional to the speed of the gas turbine. An electric to pneumatic converter 34 produces a pneumatic loading pressure proportional to the signal produced by tachometer 34 which is transmitted to port B of relay 35. The loading pressure from relay 31 is introduced into the C chamber of this relay and accordingly the output pressure at D will be proportional to the difference between the two input pressures. As shown, the output pressure of relay 35 is transmitted to valve 14. As speed increases proportional increases in the loading pressure generated in converter 34 occur which produce corresponding decreases in the loading pressure generated in relay 35. A relay 36 may be inserted in the loading line from converter 34 and biased so that the loading pressure introduced into port B of relay 35 remains at zero or other fixed value until a predetermined speed is attained and thereafter increases proportional to speed. The proportionality between speed change and input pressure to port B of relay 35 may be adjusted by adjustment of the proportional band of relay 36.

The loading pressure from relay 36 may also operate a valve 50 disposed in a by-pass line 51 around the gas turbine 5 to provide additional over speed protection particularly during self-sustaining operation. Valve 50 may be arranged to remain closed until a predetermined loading pressure out of relay 36 and thereafter open wide or open proportional to further increases in loading pressure as desired and as required to prevent compressor 4, turbine 5 and turbine 9 from exceeding a safe speed.

Suitable Selector Stations which may be of the type illustrated and described in Panich Patent 2,805,678 are provided for transferring the control from Automatic to Remote Manual and for Remote Manual operation. Thus there is shown a Master Selector Station 37 whereby an opeartor may adjust, by turning knob 38, both fuel and air simultaneously and in correct ratio to each other after the control is transferred to Manual. Selector Station 39 provides a means for the separate adjustment of fuel flow, similarly Selector Station 40 provides a means for the separate adjustment of air flow. Dump valve 15 and turbine throttle valve 14 may individually be placed on Manual by Selector Stations 41 and 42 respectively.

Suitable exhibiting means such as indicators 43–47 inclusive may be provided to indicate gas turbine speed, steam flow from generator 1, steam pressure, air flow and feed flow respectively. Such exhibiting means may be utilized by an operator when one or more of the Selector Stations are on Manual to control generator 1 in accordance with the principles hereinbefore set forth.

While I have illustrated and described a certain preferred embodiment of my invention, this is by way of example only.

What I claim as new and desire to secure by Letters Patent of the United States is:

1. In a combustion control system for a supercharged vapor generator to which fuel and air are supplied under pressure for combustion wherein the products of combustion pass through and provide the motive power for a gas turbine driving an air compressor providing the air for combustion, the air discharged from the compressor exceeding the air required for combustion in an increasing amount as the output of the generator increases, in combination, means for establishing a first control signal corresponding to the rate of air flow required for combustion, means for establishing a second control signal corresponding to the actual rate of air flow supplied for combustion, valve means for wasting a portion of the air discharge from the air compressor; and means under the joint control of said first and second control signals to adjust said valve means in a direction to increase the air wasted as the output of the generator increases to thereby maintain said second control signal equal to said first control signal.

2. In a combustion control system for a supercharged vapor generator to which fuel and air are supplied under pressure for combustion and wherein the products of combustion from the generator are utilized as the motive power for a gas turbine driving a compressor supplying the air under pressure for combustion, the air discharged from the compressor exceeding that required for combustion in an increasing amount as the output of the generator increases, in combination, means for establishing a master control signal in accordance with the rate of vapor flow from the generator, means for modifying said signal in accordance with the pressure of the vapor generated, means for establishing an air flow signal corresponding to the actual rate of air flow to the generator, and means under the joint control of said master control signal and said air flow signal for wasting air discharged from said compressor in an increasing amount as the output of the generator increases to maintain the air flow signal in predetermined ratio to the modified master control signal.

3. In a combustion control system for a supercharged vapor generator to which fuel and air are supplied under pressure for combustion and wherein the products of combustion from the generator are utilized as the motive power for a gas turbine driving a compressor supplying the air under pressure, in combination, means for establishing a master control signal in accordance with the rate of vapor flow from the generator, means for modifying said signal in accordance with the pressure of the vapor generated, means for establishing an air flow signal corresponding to the actual rate of air flow, means for wasting air discharged from said compressor to maintain the air flow signal in predetermined ratio to the modified master control signal, means for establishing a fuel flow signal in accordance with actual rate of fuel flow, and means for adjusting the rate of fuel flow to maintain the fuel flow signal in predetermined ratio with the air flow signal or the modified master signal whichever is the lesser.

4. In a combustion control system for a supercharged vapor generator to which fuel and air for combustion are supplied under pressure and wherein the products of combustion from the generator are utilized as the motive power for a gas turbine driving a compressor supplying the air under pressure, in combination, means for establishing a master control signal corresponding to the demand for fuel and air, means for establishing an air flow signal corresponding to the actual rate of air flow, means for wasting air discharged from the compressor to maintain the air flow signal in proportion to the master control signal, means for establishing a fuel flow signal corresponding to the actual rate of fuel flow and means for adjusting the rate of fuel flow to maintain the fuel flow signal in proportion to the master control signal if the demand for air is less than the actual rate of air flow and in proportion to the air flow signal if the actual rate of air flow is less than the demand therefor.

5. In a combustion control system for a supercharged vapor generator to which fuel and air for combustion are supplied under pressure and wherein the products of combustion from the generator are utilized as the motive power for a gas turbine driving a compressor supplying the air under pressure and wherein a vapor turbine is provided for assisting the gas turbine in driving the compressor and surplus compressor output is wasted, the output from said compressor when driven solely by the gas turbine being insufficient in an increasing amount to supply the air required for combustion as the rating of the generator decreases below a normal rating and exceeding that required for combustion in an increasing amount as the rating of the generator increases above said normal rating, in combination, means for establishing a control signal corresponding to the required rate of air flow for combustion, means for establishing a control signal corresponding to the actual rate of air flow for combustion, means under the control of said first and second control signals for establishing a third control signal corresponding to the difference between the first and second control signals, and means operated by the third control signal for increasing the vapor flow to the vapor turbine as the generator rating decreases below the normal rating and increasing the amount of compressor output wasted as the generator rating increases above the normal rating to maintain the first and second control signals equal.

6. In a combustion control system for a furnace to which the elements of combustion in the form of fuel and air are supplied, in combination, means for establishing a control signal corresponding to the demand for fuel and air to satisfy combustion requirements, means for establishing a control signal corresponding to the actual rate of air flow and a selective relay for selecting the lesser of said control signals for controlling the fuel flow.

7. The method of operating a supercharged vapor generator wherein the products of combustion from the vapor generator are utilized as the motive power for a gas turbine driving an air compressor providing air under pressure for combustion, which includes, utilizing all of the products of combustion to drive the gas turbine to thereby provide an excess of air in an increasing amount over that required for combustion as the rating of the generator increases and wasting an increasing portion of the air discharged from the compressor as the generator rating increases to obtain the required rate of air flow.

8. The method of operating a supercharged vapor generator wherein the products of combustion from the vapor generator are utilized as the motive power for a gas turbine driving an air compressor supplying air under pressure for combustion, the output from said compressor when driven solely by the gas turbine being insufficient in an increasing amount to supply the air required for combustion as the rating of the generator decreases below a normal rating and exceeding that required for combustion in an increasing amount as the rating of the generator increases above said normal rating, which includes, permitting all of the products of combustion to pass through the gas turbine, providing additional power to drive the compressor when the output thereof is less than that required for combustion, and wasting air discharged therefrom in an increasing amount as the rating of the generator increases above the normal rating to maintain the air supplied the generator equal to that required for combustion.

9. The method of operating a supercharged vapor generator to which fuel and air are supplied under pressure for combustion and wherein the products of combustion from the generator are utilized as the motive power for a gas turbine driving an air compressor supplying the air under pressure for combustion, which includes, maintaining the required rate of air flow by providing additional power for driving the compressor or wasting excess output thereof and adjusting fuel flow to the required rate of air flow or the actual rate of air flow whichever is the lesser.

10. The method of controlling fuel and air for combustion which includes establishing a demand signal corresponding to the desired rates of fuel and air flow, establishing an air flow signal corresponding to the actual rate of air flow, comparing said signals to determine if the actual rate of air flow is greater or lesser than the demand therefor and adjusting the fuel flow from the demand signal if the actual rate of air flow is greater than the demand therefor and from the air flow signal if the actual rate of air flow is less than the demand therefor.

References Cited in the file of this patent

UNITED STATES PATENTS

| | | |
|---|---|---|
| 2,074,696 | Johnson | Mar. 23, 1937 |
| 2,150,113 | Wunsch et al. | Mar. 7, 1939 |
| 2,341,257 | Wunsch | Feb. 8, 1944 |
| 2,377,254 | Lavigne | May 29, 1945 |
| 2,751,894 | Clarkson et al. | June 26, 1956 |
| 2,805,653 | Junkins | Sept. 10, 1957 |
| 2,870,729 | Shannon et al. | Jan. 27, 1959 |
| 2,876,727 | Barnard et al. | Mar. 10, 1959 |
| 2,911,789 | Baker | Nov. 10, 1959 |
| 2,918,790 | Schoch | Dec. 29, 1959 |
| 2,958,457 | Fox | Nov. 1, 1960 |
| 2,961,828 | Wheeler | Nov. 29, 1960 |